US011159790B2

(12) United States Patent
Xu et al.

(10) Patent No.: US 11,159,790 B2
(45) Date of Patent: Oct. 26, 2021

(54) METHODS, APPARATUSES, AND SYSTEMS FOR TRANSCODING A VIDEO

(71) Applicant: ALIBABA GROUP HOLDING LIMITED, Grand Cayman (KY)

(72) Inventors: Haohui Xu, Hangzhou (CN); Dawei Mei, Hangzhou (CN); Chang Zhou, Hangzhou (CN)

(73) Assignee: ALIBABA GROUP HOLDING LIMITED, George Town (KY)

(*) Notice: Subject to any disclaimer, the term of this patent is extended or adjusted under 35 U.S.C. 154(b) by 0 days.

(21) Appl. No.: 16/140,464

(22) Filed: Sep. 24, 2018

(65) Prior Publication Data

US 2019/0028705 A1    Jan. 24, 2019

Related U.S. Application Data

(63) Continuation of application No. PCT/CN2017/076547, filed on Mar. 14, 2017.

(30) Foreign Application Priority Data

Mar. 25, 2016 (CN) .......................... 201610179243.5

(51) Int. Cl.
*H04N 19/117* (2014.01)
*H04N 19/40* (2014.01)
*G06N 20/00* (2019.01)

(52) U.S. Cl.
CPC .......... *H04N 19/117* (2014.11); *G06N 20/00* (2019.01); *H04N 19/40* (2014.11)

(58) Field of Classification Search
CPC ............................. H04N 19/117; G06F 15/18
See application file for complete search history.

(56) References Cited

U.S. PATENT DOCUMENTS

2007/0171988 A1* 7/2007 Panda ................. H04N 19/117
375/240.29
2008/0212682 A1 9/2008 Kalva
(Continued)

FOREIGN PATENT DOCUMENTS

CN    101068355 A    11/2007
CN    101924943 A    12/2010
(Continued)

OTHER PUBLICATIONS

PCT International Search Report issued in International Application No. PCT/CN2017/076547, dated Jun. 5, 2017 (4 pages).
(Continued)

*Primary Examiner* — Jerry T Jean Baptiste
(74) *Attorney, Agent, or Firm* — Finnegan, Henderson, Farabow, Garrett & Dunner, LLP

(57) ABSTRACT

The present disclosure provides methods, apparatuses and systems for transcoding a video. One exemplary method for transcoding a video includes: receiving a model file issued by a machine learning framework; converting the model file to a file identifiable by a filter; setting one or more filtering parameters according to the file; and processing the video based on the filtering parameters. According to the embodiments of the present disclosure, no extra storage will be consumed in the process of video transcoding, and system resource consumption can be reduced without adding any extra system deployment costs.

16 Claims, 5 Drawing Sheets

(56) References Cited

U.S. PATENT DOCUMENTS

| | | | | |
|---|---|---|---|---|
| 2009/0034622 | A1* | 2/2009 | Huchet | H04N 19/154 |
| | | | | 375/240.16 |
| 2010/0238988 | A1* | 9/2010 | Jun | H04L 41/0803 |
| | | | | 375/222 |
| 2010/0296581 | A1 | 11/2010 | Metoevi et al. | |
| 2014/0241419 | A1* | 8/2014 | Holmer | H04N 21/2402 |
| | | | | 375/240.03 |
| 2016/0323358 | A1* | 11/2016 | Malhotra | G06F 16/172 |
| 2017/0078681 | A1* | 3/2017 | Coward | H04N 19/115 |
| 2017/0220949 | A1* | 8/2017 | Feng | H04L 41/16 |

FOREIGN PATENT DOCUMENTS

| | | |
|---|---|---|
| CN | 102630043 A | 8/2012 |
| CN | 103475876 A | 12/2013 |
| CN | 104850592 A | 8/2015 |
| CN | 105120130 A | 12/2015 |
| CN | 105306947 A | 2/2016 |
| WO | WO 2017/162068 A1 | 9/2017 |

OTHER PUBLICATIONS

First Chinese Search Report issued in corresponding Chinese Application No. 201610179243.5 dated Jul. 21, 2019 (2 pages).

First Chinese Office Action issued in Chinese Application No. 201610179243.5 dated Jul. 30, 2019, 16 pages.

Hu, Xueli et al. "Based on the Support Vector Machine SAR Image Enhancement and Classification," dissertation for a master degree from Xi'an University of Science and Technology, 66 pages, Apr. 15, 2008.

* cited by examiner

METHODS, APPARATUSES, AND SYSTEMS FOR TRANSCODING A VIDEO

CROSS-REFERENCE TO RELATED APPLICATIONS

The present application claims priority to International Application No. PCT/CN2017/076547, filed on Mar. 14, 2017, which claims priority to and the benefits of Chinese Patent Application No. 201610179243.5, filed on Mar. 25, 2016, both of which are incorporated by reference in their entireties.

TECHNICAL FIELD

The present disclosure relates to the field of video processing technologies, and in particular, to a method, an apparatus and a system for transcoding a video.

BACKGROUND

With the rapid development of Internet technologies, people's demand for Internet video services is also increasing. Video transcoding is a basic processing performed by almost all Internet video services. However, further processing, such as de-noising and super-resolution conversion, of some videos may be needed due to recording, copyright, age, and other issues with the videos to obtain a better video quality for viewing. Therefore, over the years, conventional video image processing technologies have been developed and applied for such further processing.

Owing to the rise of machine learning algorithms in recent years, it has been proved theoretically that machine learning methods can be used to achieve better processing effects especially for complex processing of images. However, existing machine learning methods in image processing can only be used to process single images and cannot be used to process a video. This is because an existing machine learning framework does not support video input and video output, and the complexity of transition from a picture processing procedure to a video image processing procedure is not simply an increase in the number of frames.

Therefore, devices, system, and methods are needed that take advantage of machine learning methods and more efficiently perform complex processing on a video.

SUMMARY

Embodiments of the present disclosure provides methods, apparatuses, and systems for transcoding a video that address the foregoing problem or at least partially solve the foregoing problem.

According to some embodiments of the present disclosure, methods for transcoding a video are provided. One exemplary method for transcoding a video includes: receiving a model file issued by a machine learning framework; converting the model file to a file identifiable by a filter; setting one or more filtering parameters according to the file; and processing the video based on the filtering parameters.

According to some embodiments of the present disclosure, apparatuses for transcoding a video are provided. One exemplary apparatus for transcoding a video includes: a memory storing a set of instructions and a processor. The processor can be configured to execute the set of instructions to cause the processor to perform: receiving a model file issued by a machine learning framework; converting the model file to a file identifiable by a filter; setting one or more filtering parameters according to the file; and processing the video based on the filtering parameters.

According to some embodiments of the present disclosure, systems for transcoding a video are provided. One exemplary system for transcoding a video includes a machine learning framework configured to perform training using training samples to obtain a model file and an apparatus for transcoding a video comprising. The apparatus may include a memory storing a set of instructions and a processor. The processor may be configured to execute the set of instructions to cause the processor to perform: receiving a model file issued by a machine learning framework; converting the model file to a file identifiable by a filter; setting one or more filtering parameters according to the file; and processing the video based on the filtering parameters.

According to some embodiments of the present disclosure, non-transitory computer-readable media that store a set of instructions that is executable by at least one processor of a computer to cause the computer to perform a method for transcoding a video is provided. One exemplary method for transcoding a video includes: receiving a model file issued by a machine learning framework; converting the model file to a file identifiable by a filter; setting one or more filtering parameters according to the file; and processing the video based on the filtering parameters.

According to some embodiments of the present disclosure, a model file issued by a machine learning framework is converted by a transcoding system into a file identifiable by a transcoding filter. Filtering parameters are set according to the file. Then filtering processing is performed on a video based on the filtering parameters. allowing for efficient implementation of video processing integrated with machine learning methods. Embodiments of the present disclosure process a video directly rather than converting the video to images under the restriction of the machine learning framework during processing, thereby consuming no extra storage in the process of video transcoding.

Further, according to some embodiments of the present disclosure, training samples are collected based on video processing requirements of a user. Then offline training of a machine learning model is performed using the training samples according to the corresponding machine learning framework to obtain the model file. Therefore, embodiments of the present disclosure allow the machine learning process and the actual video processing process to be set separately, which obviates the need to deploy the third-party machine learning framework on the transcoding system and thus reduces system resource consumption without adding extra system deployment costs.

In addition, according to some embodiments of the present disclosure, customized video processing services can be provided based on personalized video processing requirements provided by users through an application interface of a cloud video service center. Moreover, a template file trained by the third-party machine learning framework can be efficiently integrated into an existing video transcoding system. Video processing can be implemented by directly embedding the video into the decoding and encoding processes of the transcoding system such that integrated processing of video transcoding can be performed more efficiently and flexibly. Embodiments of the present disclosure are also more adaptable to the expansion of the transcoding system to more service scenarios in the future and are conducive to system upgrade.

As described herein, embodiments of the present disclosure do not necessarily have all the foregoing advantages at the same time. Additional features and advantages of the disclosed embodiments will be set forth in part in the description that follows, and in part will be obvious from the description, or may be learned by practice of the disclosed embodiments. The features and advantages of the disclosed embodiments will be realized and attained by the elements and combinations particularly pointed out in the appended claims. It is to be understood that both the foregoing general description and the following detailed description are examples and explanatory only and are not restrictive of the disclosed embodiments as claimed.

BRIEF DESCRIPTION OF THE DRAWINGS

The accompanying drawings constitute a part of this specification. The drawings illustrate several embodiments of the present disclosure and, together with the description, serve to explain the principles of the disclosed embodiments as set forth in the accompanying claims.

DETAILED DESCRIPTION

The technical solutions provided by the embodiments of the present disclosure will be described in further detail below with reference to the accompanying drawings and exemplary embodiments of the present disclosure. The exemplary embodiments are not intended to limit the present disclosure. All other embodiments derived by those of ordinary skill in the art based on the exemplary embodiments of the present disclosure shall fall within the protection scope of the present disclosure.

Figure 1:
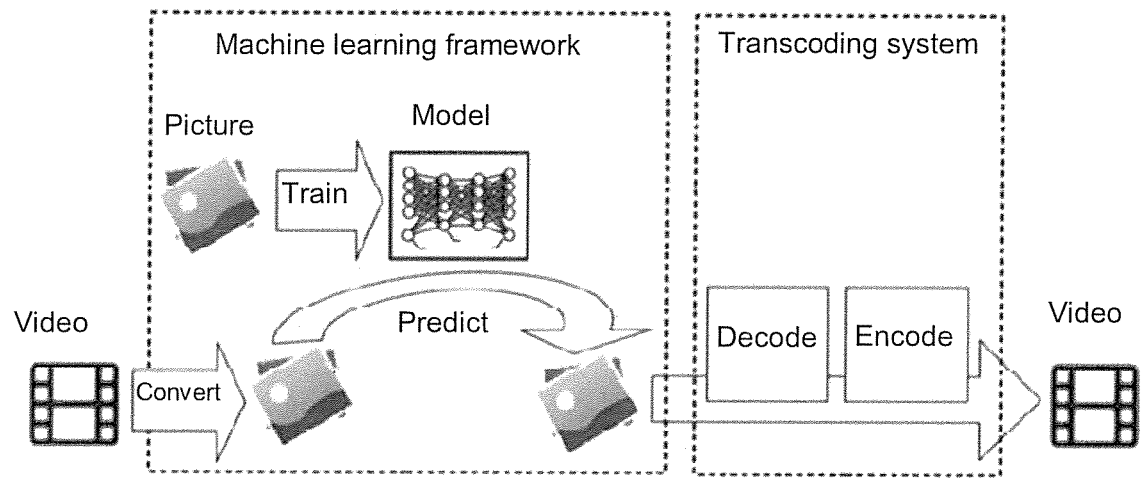
FIG. 1 is a schematic diagram illustrating video processing integrated with a machine learning framework.

As shown in FIG. 1, a method for reconstructing a super-resolution image using a convolutional network is provided. Machine learning and prediction performed by this technology are both based on a Torch library, and only allow for image processing. To perform video processing, each frame of a video needs to be first converted to a png image. After all the images are subjected to a prediction process based on a model obtained through machine learning and training methods, super-resolution processing is then performed on the images to obtain new images. Finally, sequence encoding is performed on all the processed images to form a new video.

Machine learning may generally refer to the scientific field of artificial intelligence that studies how to improve the performance of specific algorithms in experiential learning. In various applications, machine learning may refer to methods that enable a machine or algorithm to automatically optimize a process for completing a predefined task by repeatedly trying to complete the predefined the task.

Training process of machine learning may refer to a process of making a machine repeatedly trying to complete a particular task and obtaining feedback according to a particular algorithm, so that the machine can grasp specific rules and operation modes and can achieve better results when executing the task in the future. A model file is typically obtained using a large number of samples, such as texts, images, or videos.

Prediction process may refer to a process that a machine executes a particular task according to the obtained model after the learning and training process. Samples encountered in the prediction process are usually new samples not used in the training process, i.e., samples that a machine learning user really wants the machine to process.

However, the above-described method has many disadvantages for super-resolution processing or conversion of videos. First, in video processing, input and output are both videos based on the transcoding system. However, as the machine learning framework is integrated in intermediate processing, the input video has to be converted into images before being processed due to the restriction of the machine learning framework. It is recognized that this intermediate process of image conversion is redundant for video enhancement.

As described herein, video enhancement may refer to image-level operations other than simple cropping and coordinate transformation, and may include de-noising, de-jittering, super-resolution conversion, or other processing operations.

Machine learning framework may refer to a collection of algorithms, libraries, and/or software for machine learning, which can be generally embodied as open source models, projects, products, and the like, and can run on servers and/or client terminals.

Super-resolution conversion may refer to a technology of reconstructing high-resolution images from low-resolution images. As a source image (e.g., an image of low resolution) includes less information than a target image (e.g., an image of high resolution), additional information is usually needed to recover missing details. The missing details can be supplemented to some extent using simple filtering and machine learning methods.

Moreover, the conversion of a source video to images can consume a large amount of additional storage and reduce the efficiency for video processing. Also, the two processes of machine learning and conversion are strongly coupled, and the actual video processing from the video input to the final video output has to use the machine learning framework and the original transcoding system. Therefore, the use of the third-party machine learning framework can cause inconvenience to the integration and deployment of the original transcoding system, which can not only increase system deployment costs but also increase system resource consumption.

Figure 2:
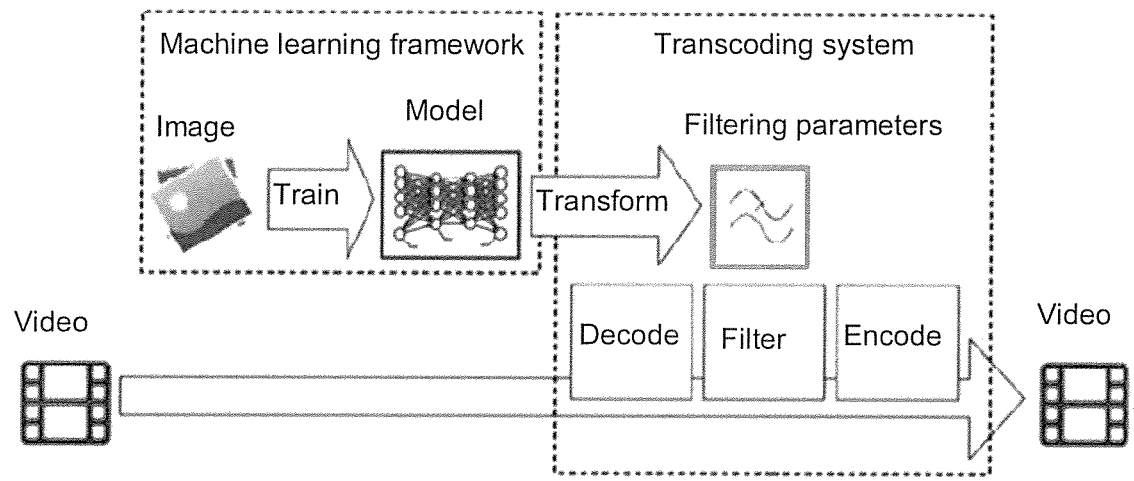
FIG. 2 is a schematic diagram illustrating video processing integrated with a machine learning framework according to some embodiments of the present disclosure.

In embodiments of the present disclosure, a third-party machine learning framework can be integrated with an existing transcoding system to implement a video transcoding function. FIG. 2 is a schematic diagram illustrating video processing integrated with a machine learning framework according to some embodiments of the present disclosure. As shown in FIG. 2, according to some embodiments of the present disclosure, training samples can be collected based on video processing requirements of a user, and then offline training can be performed using the collected training samples and the corresponding machine learning framework to obtain a model file. Therefore, in embodiments of the present disclosure, the machine learning process and the actual video processing process are set separately, which obviates the need to deploy the third-party machine learning framework on the transcoding system and thus reduces system resource consumption without adding extra system deployment costs.

As described herein, a model file may refer to a record of rules and operation modes that are summarized from repeatedly trying a specific task through machine learning. A machine may process a specific task based on the record of rules during prediction.

Figure 3:
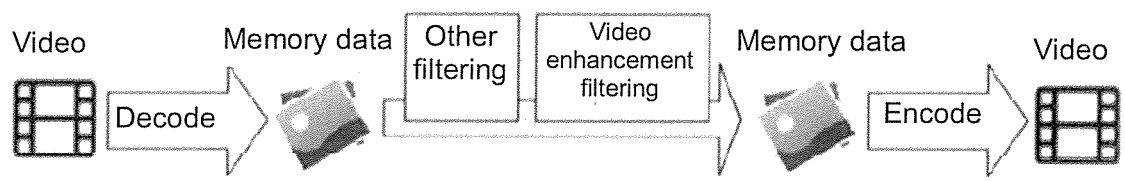
FIG. 3 is a schematic diagram illustrating video filtering processing in an exemplary system for transcoding a video according to some embodiments of the present disclosure.

Further, a model file issued by the machine learning framework is converted by the transcoding system into a file identifiable by a transcoding filter. One or more filtering parameters are set according to the file. Then filtering processing is performed on a video based on the filtering parameters. FIG. 3 is a schematic diagram illustrating video filtering processing in an exemplary system for transcoding a video according to some embodiments of the present disclosure. As shown in FIG. 3, after being inputted to the transcoding system, a video undergoes a series of processing such as decoding, filtering, and encoding, and finally an enhanced video is generated as the output. That is, video processing is implemented by directly embedding the video into the decoding and encoding procedures of the transcoding system. Therefore, embodiments of the present disclosure do not need to convert a video to images under the restriction of the machine learning framework during processing. Instead, the video is processed directly. Therefore, no extra storage is consumed in the process of video transcoding, and video transcoding processing integrated with machine learning methods can be implemented efficiently.

In addition, according to the embodiments of the present disclosure, differentiated video processing services are provided based on personalized video processing requirements made by users through an application interface in a cloud video service center. Moreover, a template file trained by the third-party machine learning framework can be efficiently integrated into an existing video transcoding system to implement integrated processing of video transcoding more efficiently and flexibly. Embodiments of the present disclosure are also more adaptable to the expansion to more service scenarios in the future and are conducive to system upgrade.

Figure 4:
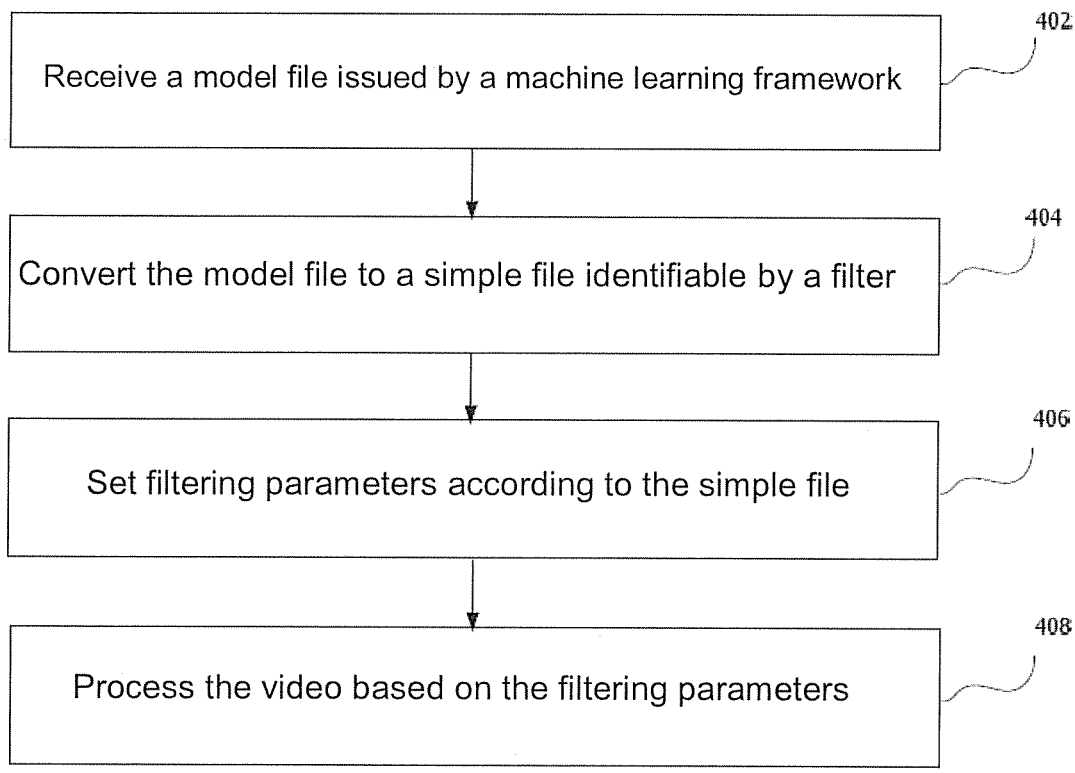
FIG. 4 is a flowchart of an exemplary method for transcoding a video according to some embodiments of the present disclosure.

FIG. 4 is a flowchart of an exemplary method for transcoding a video according to some embodiments of the present disclosure. As shown in FIG. 4, an exemplary method for transcoding a video according to the present disclosure may include the following procedures.

In step 402, a model file issued by a machine learning framework is received. In some embodiments, the machine learning framework can employ any machine learning framework library, such as a Theano library, a Caffe library, and a Torch library, to train models using samples to generate a template file.

It should be noted here that the model file can be obtained through training using various existing machine learning frameworks. Embodiments of the present disclosure does not limit the kind of machine learning framework used. In addition, according to embodiments of the present disclosure, the model file is obtained through offline training using the machine learning framework. The process is independent from the actual video processing. As such, template files can be generated through the most appropriate machine learning frameworks according to different requirements respectively. There is no need to address the problem of integrating the machine learning framework to the transcoding system.

In step 404, the model file is converted to a file identifiable by a filter. In some embodiments of the present disclosure, the model file can be converted to a text file identifiable by a filter of a transcoding system, such as a filter of an Ffmpeg tool. It should be noted herein that in some applications, the model file issued by a machine learning framework is converted into a file accepted by a filter of a transcoding system. The conversion can support one-way conversion from the model file issued by the machine learning framework into the file supported by the filter of the transcoding system, and its reverse process does not need to be addressed, thereby reducing the complexity of parameter format design and the workload of implementing the model conversion process.

In step 406, one or more filtering parameters are set according to the file. It should be noted that as a model file issued by the machine learning framework can vary each time. Under most circumstances, a filter format can be designed once, including filter implementation. The model file conversion may be implemented once for each machine learning framework employed. The filtering parameters can be reset for the file obtained through each conversion.

In step 408, the video is processed based on the filtering parameters. In some embodiments of the present disclosure, processing the video based on the filtering parameters can further include decoding an input video; filtering the decoded video based on the filtering parameters; and encoding the filtered video, and outputting the encoded filtered video.

It should be noted that in some applications, the original transcoding procedure may not change. For example, a video to be processed is first decoded by a decoder. Then video enhancement processing is performed on each frame of image in a preset filter, and the processed images are further sent to an encoder to be encoded and output.

According to some embodiments of the present disclosure, a model file issued by a machine learning framework is converted by a transcoding system into a file identifiable by a transcoding filter. Filtering parameters are set according to the file. Then filtering processing is performed on a video based on the filtering parameters, allowing for efficient implementation of video processing integrated with machine learning methods. Embodiments of the present disclosure process the video directly rather than converting a video to images under the restriction of the machine learning framework during processing; thereby consuming no extra storage in the process of video transcoding.

Further, according to some embodiments of the present disclosure, training samples are collected based on video processing requirements of a user, and then offline training is performed using the training samples and the corresponding machine learning framework to obtain the model file. Therefore, in embodiments of the present disclosure, the machine learning process and actual video processing process are set separately. This obviates the need to deploy the third-party machine learning framework on the transcoding system and thus reduces system resource consumption without adding extra system deployment costs.

Figure 5:
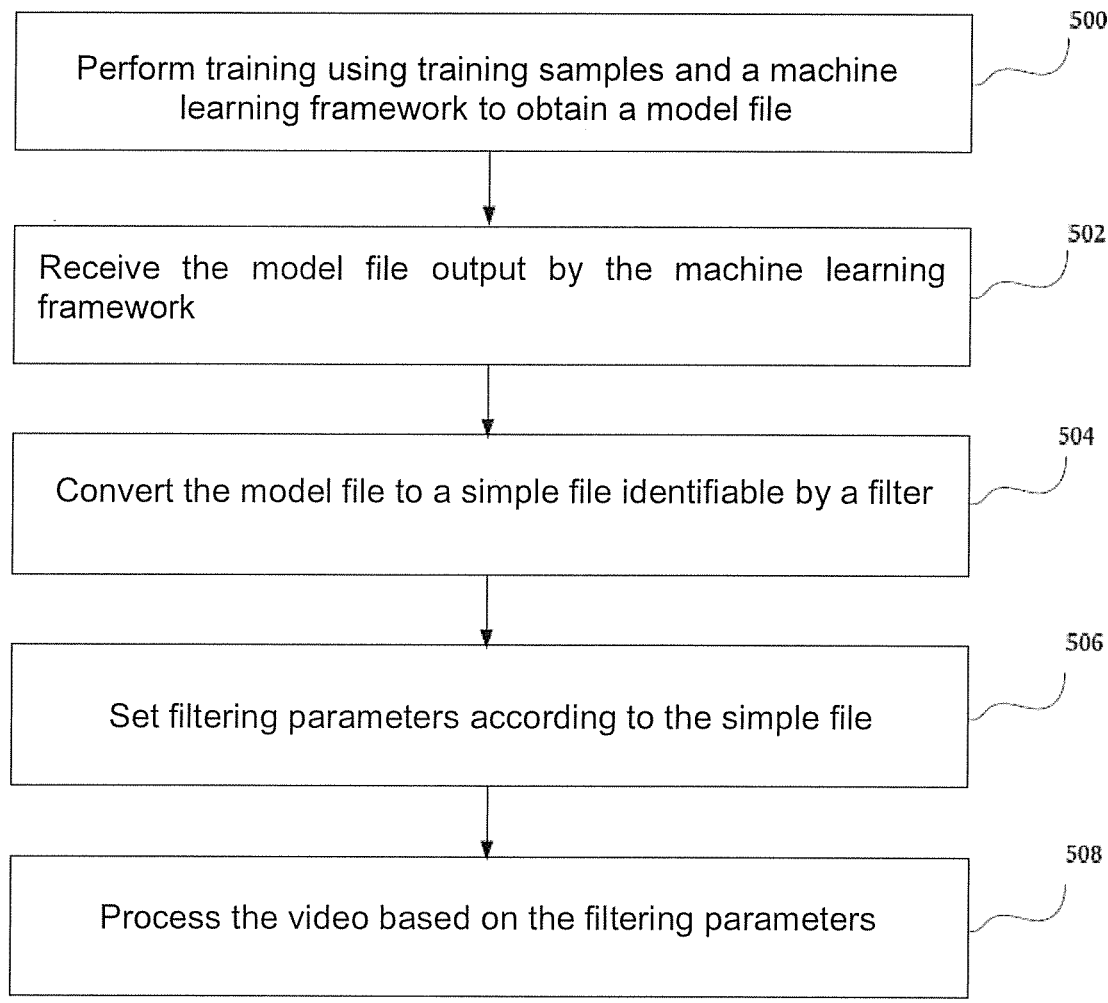
FIG. 5 is a flowchart of an exemplary method for transcoding a video according to some embodiments of the present disclosure.

FIG. 5 is a flowchart of an exemplary method for transcoding a video according to some embodiments of the present disclosure. As shown in FIG. 5, an exemplary method for transcoding a video may include the following procedures.

In step 500, training is performed using training samples and a machine learning framework to obtain a model file. In some embodiments, performing training using training samples and a machine learning framework to obtain a model file can further include steps 510 and 520 (not shown in FIG. 5).

In step 510, training samples are collected based on video processing requirements of a user. In some embodiments, based on a user's specific requirement for video enhancement, such as super-resolution conversion or de-noising, the training samples can be a large number of images previously collected, such as tens of thousands of images and the like.

In step 520, offline training is performed using the training samples to obtain the model file. In some embodiments, the machine learning framework can employ any machine learning framework library, such as a Theano library, a Caffe library, and a Torch library, to train the samples to generate a template file. It should be noted here that the model file can be obtained through training using various existing machine learning frameworks. Embodiments of the present disclosure do not limit the kind of machine learning framework used.

The model file can be obtained through offline training using the machine learning framework. This process is independent of the process of actual video processing. As such, template files can be generated using the most appropriate machine learning frameworks according to different requirements respectively. There is no need to address the problem of integrating the learning framework to the transcoding system.

In step 502, the model file issued by the machine learning framework is received. It should be noted that the model file is obtained through training using the machine learning framework. Therefore, during actual video processing, the model file obtained through offline training using the machine learning framework is received by the transcoding system.

In step 504, the model file is converted to a file identifiable by a filter. In some embodiments of the present disclosure, the model file can be converted to a text file identifiable by a filter of a transcoding system, such as a filter of an Ffmpeg tool.

It should be noted here that in some applications, the model file issued by the machine learning framework is converted into a file accepted by a filter of a transcoding system. The conversion can support one-way conversion from the model file issued by the machine learning framework into the file supported by the filter of the transcoding system, and its reverse process does not need to be addressed, thereby reducing the complexity of parameter format design and the workload of implementing the model conversion process.

In step 506, one or more filtering parameters are set according to the file. The model file issued by the machine learning framework can vary each time. Under most circumstances, a filter format can be designed once, including filter implementation. The model file conversion may be implemented once for each machine learning framework employed. The filtering parameters can be reset for the file obtained through each conversion.

In step 508, the video is processed based on the filtering parameters. In some embodiments of the present disclosure, processing the video based on the filtering parameters can further include: decoding an input video; filtering the decoded video based on the filtering parameter; and encoding the filtered video and outputting the encoded filtered video.

It should be noted that in some applications, the original transcoding procedure may not change. For example, a video to be processed is first decoded by a decoder. Then video enhancement processing is be performed on each frame of image in a preset filter, and the processed images are further sent to an encoder to be encoded and output.

According to some embodiments of the present disclosure, a model file issued by a machine learning framework is converted by a transcoding system into a file identifiable by a transcoding filter. Filtering parameters are set according to the file. Then filtering processing is performed on a video based on the filtering parameters, allowing for efficient implementation of video processing integrated with machine learning. Embodiments of the present disclosure process the video directly rather than converting a video to images under the restriction of the machine learning framework during processing, thereby consuming no extra storage will be consumed in the process of video transcoding.

Further, according to some embodiments of the present disclosure, training samples are collected based on video processing requirements of a user, and then offline training is performed using the training samples and the corresponding machine learning framework to obtain the model file. Therefore, in some embodiments of the present disclosure, the machine learning process and actual video processing process are set separately. This obviates the need to deploy the third-party machine learning framework on the transcoding system and thus reduces system resource consumption without adding any extra system deployment costs.

In addition, according to some embodiments of the present disclosure, differentiated video processing services are provided based on personalized video processing requirements made by users through an application interface in a cloud video service center. Moreover, a template file trained by the third-party machine learning framework can be efficiently integrated into an existing video transcoding system. Video processing is implemented by directly embedding the video into decoding and encoding processes of the transcoding system to achieve integrated processing of video transcoding more efficiently and flexibly. Embodiments of the present disclosure are also more adaptable to the expansion to more service scenarios in the future and is conducive to system upgrade.

An exemplary application of some embodiments of the present disclosure is described in the following with reference to a service scenario.

In one service scenario, the function of converting a video to a high-definition service is implemented on a multimedia transcoding service (MTS). MTS may refer to the conversion of a video stream that has been compressed and encoded into another video stream to adapt to different network bandwidths, different terminal processing capabilities, and/or different user requirements. Transcoding involves a process of decoding incoming data first and then encoding. Therefore, video streams before and after the conversion can follow the same video encoding standard or can follow different video encoding standards. For example, if a user wants to remake an animation to achieve high definition, the user can make, through the MTS, an online requirement for enhancing the animation video. For example, super-resolution processing can be performed on the video such that the animation video is converted into a high-definition video.

After tens of thousands of images are collected based on the user's requirement, a machine learning framework runs a particular algorithm to perform offline training using the tens of thousands of images to obtain a corresponding model file. Because the training process is independent of the actual video enhancement process, the training machine can be directly deployed in an experimental environment.

In one exemplary application of the embodiments of the present disclosure, the model file is obtained through training using a Torch machine learning framework based on the Lua language. It should be noted here that many machine learning frameworks, for example, machine learning frameworks libraries, such as a Theano, Caffe, or Torch library can all be applied in the embodiments of the present disclosure. Therefore, suitable machine learning frameworks can be selected according to different requirements respectively, and there is no need to address the problem of integrating the machine learning framework to the transcoding system.

In one example, the MTS receives a binary model file obtained through training using a Torch machine learning framework and converts the binary model file to a file supported or identified by a transcoding filter. Here, the MTS may employ a filter of a transcoding system, such as a filter of Ffmpeg tool for filter processing, and thus the binary model file needs to be converted to a simple text file. It should be noted here that in some applications, the model file issued by a machine learning framework is converted into a file identifiable by a filter of a transcoding system. The conversion can support one-way conversion from the model file issued by the machine learning framework into the file supported by the filter of the transcoding system, and its reverse process does not need to be addressed, thereby thus reducing the complexity of parameter format design and the workload of implementing the model conversion process. It should be noted that as a model file issued by the machine learning framework may vary each time. Under most circumstances, a filter format can be designed once, including filter implementation. The model file conversion may be implemented once for each machine learning framework employed. The filtering parameters need to be reset for the file obtained through each conversion.

The MTS decodes the source video, filters each frame of the video using a filter, e.g., a filter for completing the process of super-resolution processing, then encodes the processed video, and finally outputs an enhanced video.

It should be noted here that during the implementation of the conversion of a video to a high-definition service on the MTS, the format of a filter of the transcoding system, such as a filter of an Ffmpeg tool, can be deployed once. If the model file changes subsequently, filter update and upgrade can be completed by sending the updated model file to the transcoding system.

Therefore, embodiments of the present disclosure may have one or more of the following advantages.

According to embodiments of the present disclosure, a model file issued by a machine learning framework is converted by a transcoding system into a file identifiable by a transcoding filter. Filtering parameters are set according to the file. Then filtering processing is performed on a video based on the filtering parameters, allowing for efficient implementation of video processing integrated with machine learning. Embodiments of the present disclosure process the video directly rather than converting a video to images under the restriction of the machine learning framework during processing, thereby consuming; no extra storage in the process of video transcoding.

Further, according to embodiments of the present disclosure, training samples are collected based on video processing requirements of a user, and then offline training is performed using the training samples and the corresponding machine learning framework to obtain the model file. Therefore, in the embodiments of the present disclosure, the machine learning process and actual video processing process are set separately. This obviates the need to deploy the third-party machine learning framework on the transcoding system and thus reduces system resource consumption without adding any extra system deployment costs.

In addition, according to embodiments of the present disclosure, differentiated video processing services are provided based on personalized video processing requirements made by users through an application interface in a cloud video service center. Moreover, a template file trained by the third-party machine learning framework can be efficiently integrated into an existing video transcoding system. Video processing is implemented by directly embedding the video into the decoding and encoding processes of the transcoding system to achieve integrated processing of video transcoding more efficiently and flexibly. Embodiments of the present disclosure are also more adaptable to the expansion to more service scenarios in the future and is conducive to system upgrade.

It should be noted that although the foregoing exemplary embodiments are described as a sequence of combined procedures, those skilled in the art should understand that embodiments consistent with the present disclosure are not limited to the described sequence of procedures. As described, some procedures can be performed in another sequence or at the same time consistent with embodiments of the present disclosure. In addition, those skilled in the art should also understand that the embodiments described herein are exemplary, and various embodiments consistent with the present disclosure may not include all the procedures described above.

Figure 6:
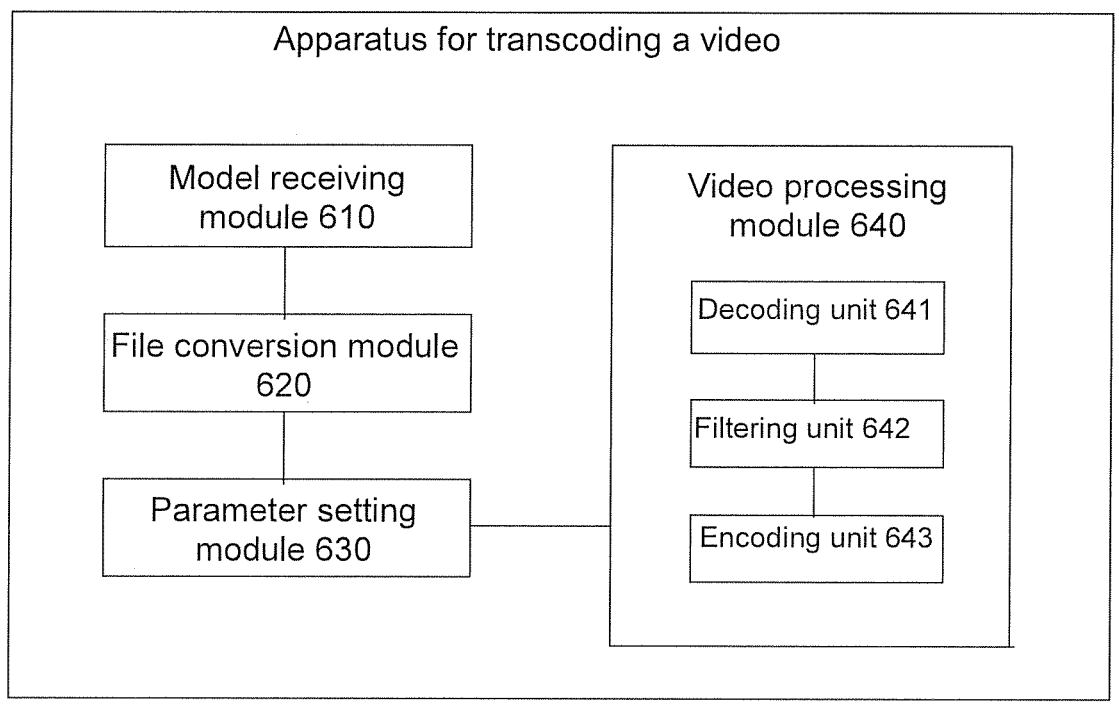
FIG. 6 is a structural block diagram of an exemplary apparatus for transcoding a video according to some embodiments of the present disclosure.

FIG. 6 is a structural block diagram of an exemplary apparatus for transcoding a video according to some embodiments of the present disclosure. As shown in FIG. 6, an exemplary apparatus for transcoding a video may include the following modules.

A model receiving module 610 is configured to receive a model file issued by a machine learning framework.

As described herein, the machine learning framework can employ any machine learning framework library, such as a Theano library, a Caffe library and a Torch library to train samples to generate a template file.

It should be noted here that the model file can be obtained through training using various existing machine learning frameworks. Embodiments of the present disclosure does not limit the kind of machine learning framework used.

In addition, the model file is obtained through offline training using the machine learning framework. The process is independent of the process of actual video processing. As such, template files can be generated through the most appropriate machine learning frameworks according to different requirements respectively. There is no need to address the problem of integrating the learning framework to the transcoding system.

A file conversion module 620 is configured to convert the model file to a file identifiable by a filter.

In some embodiments of the present disclosure, the model file can be converted to a text file identifiable by a filter of a transcoding system, such as a filter of an Ffmpeg tool.

It should be noted here that in some applications, the model file issued by a machine learning framework is converted into a file accepted by a filter of a transcoding system. The conversion can support one-way conversion from the model file issued by the machine learning framework into the file supported by the filter of the transcoding system, and its reverse process does not need to be addressed, thereby reducing the complexity of parameter format design and the workload of implementing the model conversion process.

A parameter setting module 630 is configured to set one or more filtering parameters according to the file that is obtained by the file conversion module 620 after the conversion.

It should be noted that as a model file issued by the machine learning framework can vary each time. Under most circumstances, a filter format can be designed once, including filter implementation. The model file conversion may be implemented once for each machine learning framework employed. The filtering parameters can be reset for the file obtained through each conversion.

A video processing module 640 is configured to process the video based on the filtering parameters set by the parameter setting module 630.

In some embodiments of the present disclosure, the video processing module 640 can include the following units: a decoding unit 641 configured to decode an input video; a filtering unit 642 configured to filter, based on the filtering parameters, the video decoded by the decoding unit 641; and an encoding unit 643 configured to encode the video filtered by the filtering unit 642 and then output the encoded filtered video.

It should be noted that in some applications, the original transcoding procedure may not change. For example, a video to be processed is first decoded by a decoder. Then video enhancement processing is performed on each frame of image in a preset filter, and the processed images are further sent to an encoder to be encoded and output.

According to some embodiments of the present disclosure, a model file issued by a machine learning framework is converted by a transcoding system into a file identifiable by a transcoding filter. Filtering parameters are set according to the file. Then filtering processing is performed on a video based on the filtering parameters, allowing for efficient implementation of video processing integrated with machine learning. Embodiments of the present disclosure process the video directly rather than converting a video to images under the restriction of the machine learning framework during processing, thereby consuming no extra storage in the process of video transcoding.

Further, according to some embodiments of the present disclosure, training samples are collected based on video processing requirements of a user, and then offline training is performed using the training samples and the corresponding machine learning framework to obtain the model file. Therefore, in these embodiments of the present disclosure, the machine learning process and actual video processing process are set separately. This obviates the need to deploy the third-party machine learning framework on the transcoding system and thus reduces system resource consumption without adding any extra system deployment costs.

Figure 7:
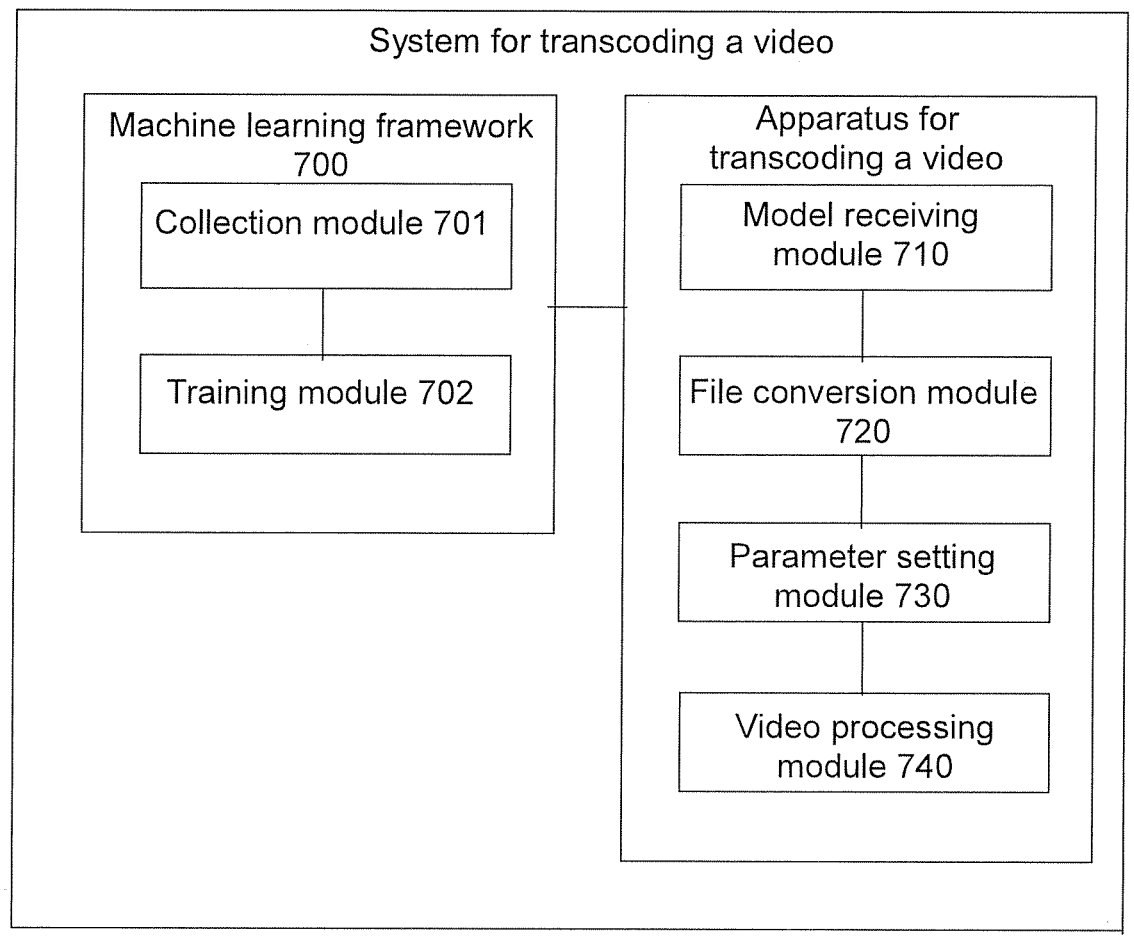
FIG. 7 is a structural block diagram of an exemplary system for transcoding a video according to some embodiments of the present disclosure.

FIG. 7 is a structural block diagram of an exemplary system for transcoding a video according to some embodiments of the present disclosure. As shown in FIG. 7, an exemplary system for transcoding a video according to the present disclosure can include the following components.

A machine learning framework 700 configured to perform training using training samples to obtain a model file.

In some embodiments of the present disclosure, the machine learning framework 700 may further include: a collection module 701 configured to collect training samples based on a video processing requirement; and a training module 702 configured to perform offline training using the training samples collected by the collection module to obtain the model file.

As described herein, the machine learning framework can employ any machine learning framework library, such as a Theano library, a Caffe library and a Torch library to train samples so as to generate a template file. It should be noted here that the model file can be obtained through training using various existing machine learning frameworks. Embodiments of the present disclosure does not limit the kind of machine learning framework used.

In addition, the model file is obtained through offline training using the machine learning framework. The process is independent of the process of actual video processing. As such, template files can be generated through the most appropriate machine learning frameworks according to different requirements respectively. There is no need to address the problem of integrating the learning framework to the transcoding system.

In some embodiments, an apparatus for transcoding a video may include the following modules.

A model receiving module 710 is configured to receive the model file issued by the machine learning framework.

It should be noted that the model file is obtained through training using the machine learning framework. Therefore, during actual video processing, the model file obtained through offline training from the machine learning framework is received by the transcoding system.

A file conversion module 720 is configured to convert the model file to a file identifiable by a filter.

In some embodiments of the present disclosure, the model file can be converted to a text file identifiable by a filter of a transcoding system, such as a filter of an Ffmpeg tool.

It should be noted here that in some applications, the model file issued by a machine learning framework is converted into a file accepted by a filter of a transcoding system. The conversion can support one-way conversion from the model file issued by the machine learning framework into the file supported by the filter of the transcoding system, and its reverse process does not need to be addressed, thereby reducing the complexity of parameter format design and the workload of implementing the model conversion process.

A parameter setting module 730 is configured to set one or more filtering parameters according to the file obtained by the file conversion module 720 after the conversion.

It should be noted that as a model file issued by the machine learning framework can vary each time. Under most circumstances, a filter format can be designed once, including filter implementation. The model file conversion may be implemented once for each machine learning framework employed. The filtering parameters can be reset for the file obtained through each conversion.

A video processing module 740 is configured to process the video based on the filtering parameters set by the parameter setting module 730.

In some embodiments of the present disclosure, the video processing module 740 can further include: a decoding unit configured to decode an input video; a filtering unit configured to filter, based on the filtering parameters, the video decoded by the decoding unit; and an encoding unit configured to encode the video filtered by the filtering unit and then output the encoded filtered video.

It should be noted that in some applications, the original transcoding procedure may not change. For example, a video to be processed is first decoded by a decoder. Then video enhancement processing will be performed on each frame of image in a preset filter, and the processed images are further sent to an encoder to be encoded and output.

According to some embodiments of the present disclosure, a model file issued by a machine learning framework is converted by a transcoding system into a file identifiable by a transcoding filter. Filtering parameters are set according to the file. Then filtering processing is performed on a video based on the filtering parameters, allowing for efficient implementation of video processing integrated with machine learning. Embodiments of the present disclosure process the video directly rather than converting a video to images under the restriction of the machine learning framework during processing, thereby consuming no extra storage in the process of video transcoding.

Further, according to some embodiments of the present disclosure, training samples are collected based on video processing requirements of a user, and then offline training is performed using the training samples and the corresponding machine learning framework to obtain the model file. Therefore, in the embodiments of the present disclosure, the machine learning process and actual video processing process are set separately. This obviates the need to deploy the third-party machine learning framework on the transcoding system and thus reduces system resource consumption without adding any extra system deployment costs.

In addition, according to some embodiments of the present disclosure, differentiated video processing services are provided based on personalized video processing requirements made by users through an application interface in a cloud video service center. Moreover, a template file trained by the third-party machine learning framework can be efficiently integrated into an existing video transcoding system. Video processing is implemented by directly embedding the video into decoding and encoding processes of the transcoding system to achieve integrated processing of video transcoding more efficiently and flexibly. Embodiments of the present disclosure are also more adaptable to the expansion to more service scenarios in the future and is conducive to system upgrade.

As described herein, the exemplary apparatuses for transcoding a video may use the exemplary methods for transcoding a video described above.

Identical, related, or similar parts in the apparatus and method embodiments can be obtained with reference to each other. The foregoing embodiments are merely used for illustrating the technical solutions provided by the present disclosure and are not intended to limit the present disclosure. Those skilled in the art can make various changes and modifications consistent with the present disclosure. Such modifications shall fall within the protection scope of the present disclosure.

Those skilled in the art should understand that, embodiments of the present disclosure can be provided as a method, an apparatus, or a computer program product, etc. Therefore, embodiments of the present disclosure can take the form of an entirely hardware embodiment, an entirely software embodiment, or an embodiment combining software and hardware. Moreover, embodiments of the present disclosure can be in the form of a computer program product stored on a computer-readable medium and executed by a computing device or a computing system. The computer-readable medium may, include, but not limited to, a magnetic disk memory, a CD-ROM, an optical memory, and the like, for storing computer-readable program codes. The computing device or computing system may include at least one of a microprocessor, a processor, a central processing unit (CPU), a graphical processing unit (GPU), etc. In general, the computer program product may include routines, procedures, objects, components, data structures, processors, memories, and the like for performing specific tasks or implementing a sequence of steps or operations.

In some embodiments, the computing device includes one or more processors (CPU), an input/output interface, a network interface, and a computer-readable medium. The computer-readable medium may include at least one of non-volatile storage media, volatile storage media, movable media, and non-movable media, and can store information or data using a suitable method or technology. The information can be computer-readable instructions, data structures, and modules of a computer program or other data. Exemplary computer-readable media may include, but not limited to, a Random-Access Memory (RAM), such as a phase change memory (PRAM), a static random access memory (SRAM), a dynamic random access memory (DRAM), or other types of RAMs, a Read-Only Memory (ROM), such as an electrically erasable programmable read-only memory (EEPROM), a flash memory or a memory based on other technologies, a compact disc read-only memory (CD-ROM), a digital versatile disc (DVD) or other optical storages, a cassette tape, a magnetic tape or magnetic disk storage or other magnetic storage devices, or any other non-transitory medium for storing information accessible to the computing device. As described herein, computer-readable media does not include transitory media, such as modulated data signals and carrier signals.

Embodiments of the present disclosure are described with reference to flowcharts and/or block diagrams illustrating exemplary methods, terminal devices or systems, and computer program products consistent with the present disclosure. It should be understood that a computer program instruction may be used to implement a process, a block in the flowcharts, a block in the block diagrams, and/or a combination of processes, blocks in the flowcharts, and/or block diagrams. Computer program instructions may be provided to a commuter, an embedded processor, or a processor of a programmable data processing terminal device to generate a machine such that a computer or a processor of the programmable data processing terminal device executes computer program instructions to construct an apparatus configured to implement functions of one or more processes in a flowchart and/or one or more blocks in a block diagram.

The computer program instructions may also be stored in a computer-readable memory that can provide instructions to a computer or another programmable data processing terminal device to work in a specific manner, such as implementing functions of one or more processes in a flowchart and/or one or more blocks in a block diagram.

The computer program instructions may also be loaded to a computer or another programmable data processing terminal device such that a sequence of operational steps are executed on the computer or the programmable terminal device to perform computer-implemented processing. Therefore, the instructions executed by the computer or the programmable terminal device provides steps or procedures for implementing functions of one or more processes in a flowchart and/or one or more blocks in a block diagram.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as example only, with a true scope and spirit being indicated by the following claims and their full scope of equivalents.

This description and the accompanying drawings that illustrate exemplary embodiments should not be taken as limiting. Various structural, electrical, and operational changes may be made without departing from the scope of this description and the claims, including equivalents. In some instances, well-known structures and techniques have not been shown or described in detail so as not to obscure the disclosure. Similar reference numbers in two or more figures represent the same or similar elements. Furthermore, elements and their associated features that are disclosed in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

Finally, it should be noted that, the relational terms such as "first" and "second" are only used to distinguish an entity or operation from another entity or operation, and do necessarily require or imply that any such actual relationship or order exists among these entities or operations. It should be further noted that, as used in this specification and the appended claims, the singular forms "a," "an," and "the," and any singular use of any word, include plural referents unless expressly and unequivocally limited to one referent. As used herein, the terms "include," "comprise," and their grammatical variants are intended to be non-limiting, such that recitation of items in a list is not to the exclusion of other like items that can be substituted or added to the listed items. The term "if" may be construed as "at the tune of," "when," "in response to," or "in response to determining."

Exemplary methods, apparatuses, and systems for transcoding a video consistent with the present disclosure are described in detail above, and the principles and implementation manners of the present disclosure are illustrated by the exemplary embodiments. The description of the exemplary embodiments is merely used to help understand the present disclosure and its core ideas. Other embodiments will be apparent from consideration of the description and practice of the embodiments disclosed herein. It is intended that the description and examples be considered as example only, with a true scope and spirit of the disclosed embodiments being indicated by the following claims.

What is claimed is:

1. A method for transcoding a video, the method performed by a video transcoding apparatus and comprising:
   receiving a model file issued by a machine learning framework separate from the video transcoding apparatus, the model file comprising a record of rules and operation modes, wherein the model file is obtained from offline training performed by the machine learning framework using training samples;
   converting the model file to a text file identifiable by a filter of a transcoding system;
   setting one or more filtering parameters according to the text file; and
   processing, by the video transcoding apparatus, the video based on the one or more filtering parameters.

2. The method of claim 1, prior to receiving the model file issued by the machine learning framework, the method further comprises:
   performing training using training samples and the machine learning framework to obtain the model file.

3. The method of claim 2, wherein performing training using the training samples and the machine learning framework to obtain the model file further comprises:
   collecting training samples based on a video processing requirement; and
   performing offline training using the training samples to obtain the model file.

4. The method of claim 1, wherein processing the video based on the filtering parameters comprises:
   decoding an input video;
   filtering the decoded video based on the filtering parameters; and
   encoding the filtered video and then outputting the encoded filtered video.

5. An apparatus for transcoding a video, comprising:
   a memory storing a set of instructions; and
   a processor configured to execute the set of instructions to cause the apparatus to perform:
      receiving a model file issued by a machine learning framework separate from the video transcoding apparatus, the model file comprising a record of rules and operation modes, wherein the model file is obtained from offline training performed by the machine learning framework using training samples;
      converting the model file to a text file identifiable by a filter of a transcoding system;
      setting one or more filtering parameters according to the text file; and
      processing the video based on the filtering parameters.

6. The apparatus of claim 5, wherein the processor is configured to execute the set of instructions to cause the apparatus to further perform training using training samples and the machine learning framework to obtain the model file.

7. The apparatus of claim 6, wherein performing training using the training samples and the machine learning framework to obtain the model file further comprises:
   collecting training samples based on a video processing requirement; and
   performing offline training using the training samples to obtain the model file.

8. The apparatus of claim 5, wherein processing the video based on the filtering parameters comprises:
   decoding an input video;
   filtering the decoded video based on the filtering parameters; and
   encoding the filtered video and then outputting the encoded filtered video.

9. A system for transcoding a video, comprising:
   a machine learning framework configured to perform offline training using training samples to obtain a model file; and
   an apparatus for transcoding a video separate from the machine learning framework, the apparatus comprising:
      a memory storing a set of instructions; and
      a processor configured to execute the set of instructions to cause the apparatus to perform:

receiving a model file issued by the machine learning framework, the model file comprising a record of rules and operation modes;

converting the model file to a text file identifiable by a filter of a transcoding system;

setting one or more filtering parameters according to the text file; and processing the video based on the one or more filtering parameters.

10. The system of claim 9, wherein training using training samples to obtain a model file further comprises collecting training samples based on a video processing requirement; and performing offline training using the training samples to obtain the model file.

11. The system of claim 9, wherein the machine learning framework uses any of a Theano library, a Caffe library, and a Torch library.

12. The system of claim 9, wherein processing the video based on the filtering parameters comprises:

decoding an input video;

filtering the decoded video based on the filtering parameters; and encoding the filtered video and then outputting the encoded filtered video.

13. A non-transitory computer-readable medium that stores a set of instructions that is executable by at least one processor of a computer to cause the computer to perform a method for transcoding a video, the method comprising:

receiving, by a video transcoding apparatus, a model file issued by a machine learning framework separate from the video transcoding apparatus, the model file comprising a record of rules and operation modes, wherein the model file is obtained from offline training performed by the machine learning framework using training samples;

converting the model file to a text file identifiable by a filter of a transcoding system;

setting one or more filtering parameters according to the text file; and processing, by the video transcoding apparatus, the video based on the one or more filtering parameters.

14. The non-transitory computer-readable medium of claim 13, wherein prior to receiving the model file issued by the machine learning framework, the method further comprises:

performing training using training samples and the machine learning framework to obtain the model file.

15. The non-transitory computer-readable medium of claim 14, wherein performing training using the training samples and the machine learning framework to obtain the model file further comprises:

collecting training samples based on a video processing requirement; and performing offline training using the training samples to obtain the model file.

16. The non-transitory computer-readable medium of claim 13, wherein processing the video based on the filtering parameters comprises:

decoding an input video;

filtering the decoded video based on the filtering parameters; and encoding the filtered video and then outputting the encoded filtered video.

* * * * *